US006379102B1

(12) United States Patent
Kameda

(10) Patent No.: US 6,379,102 B1
(45) **Date of Patent: *Apr. 30, 2002**

(54) WHEELCHAIR LIFT WITH FOLDABLE PLATFORM

(75) Inventor: Fujio Kameda, Saitama-Ken (JP)

(73) Assignee: Ricon Corporation, Panorama City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/565,904

(22) Filed: May 5, 2000

Related U.S. Application Data

(63) Continuation of application No. 09/087,058, filed on May 29, 1998, now abandoned.

(51) Int. Cl.[7] .................................................... B60P 1/44
(52) U.S. Cl. ........................................ 414/546; 414/921
(58) Field of Search ................................ 414/539, 540, 414/545, 546, 556, 558, 921

(56) References Cited

U.S. PATENT DOCUMENTS

| | | | | | |
|---|---|---|---|---|---|
| 3,651,965 | A | * | 3/1972 | Simonelli et al. | 414/540 |
| 4,007,844 | A | * | 2/1977 | Perkins | 414/545 |
| 4,140,230 | A | * | 2/1979 | Pearson | 414/546 |
| 4,353,436 | A | | 10/1982 | Rice et al. | |
| 4,408,948 | A | * | 10/1983 | Robinson | 414/545 |
| 4,534,450 | A | | 8/1985 | Savaria | |
| 4,984,955 | A | * | 1/1991 | McCullough | 414/546 |
| 5,261,779 | A | * | 11/1993 | Goodrich | 414/546 |
| 5,401,135 | A | * | 3/1995 | Stoen et al. | 414/546 |
| 5,564,884 | A | * | 10/1996 | Farsai | 414/546 |
| 5,605,431 | A | * | 2/1997 | Saucier et al. | 414/546 |
| 5,672,041 | A | * | 9/1997 | Ringdahl et al. | 414/540 X |
| 5,806,632 | A | * | 9/1998 | Budd et al. | 414/921 |
| 6,086,314 | A | * | 7/2000 | Savaria | 414/546 |

FOREIGN PATENT DOCUMENTS

| | | | | |
|---|---|---|---|---|
| GB | 2106857 | * | 4/1983 | 414/545 |

OTHER PUBLICATIONS

Advertising brochure for vehicular wheelchair lift manufactured by Wako Industry Company, Ltd.

* cited by examiner

*Primary Examiner*—James W. Keenan
(74) *Attorney, Agent, or Firm*—Jeffer, Mangels, Butler & Marmaro LLP

(57) ABSTRACT

A powered vehicular wheelchair lift with an automatic folding platform assembly for persons who are physically challenged or otherwise have limited mobility. The wheelchair lift is used in conjunction with a vehicle having an opening and a floor. The wheelchair lift includes a mounting assembly mounted to the vehicle floor adjacent to the vehicle opening. A power actuating system includes a pair of hydraulic cylinders mounted on opposite sides of a pair of relative parallelogram linkage structures of the wheelchair lift. The wheelchair lift has a foldable platform assembly which includes two platform plates pivotably connected along their adjacent transverse edges, where the platform assembly moves from a stowed position inside the vehicle to an entry position at the vehicle opening and inversely (i.e., from the entry level position to the stowed position), and moves the platform assembly between the entry level position and a ground level position outside the vehicle and inversely (i.e., from the ground level position to the entry level position). The wheelchair lift further has a pivotable linkage assembly for facilitating the unfolding of the platform assembly as the platform assembly moves from the swing-down deployment motion (from the stowed position to the entry level position) to unfold the two plates into a substantially horizontal position and coplanar to each other at the entry position and between the entry position and the ground position, and also for the folding of the platform assembly as the platform moves during the swing-up stowaway motion (from the entry level position to the stowed position).

14 Claims, 6 Drawing Sheets

WHEELCHAIR LIFT WITH FOLDABLE PLATFORM

This application is a continuation of application Ser. No. 09/087,058 filed on May 29, 1998 now abandoned.

BACKGROUND OF THE INVENTION

1. Field of the Invention

The present invention generally relates to the field of vehicular wheelchair lifts for persons who are physically challenged or otherwise have limited mobility. More particularly, the present invention relates to the field of powered wheelchair lifts with automatically foldable platforms.

2. Description of the Prior Art

Vehicular wheelchair lifts are widely utilized to assist persons in wheelchairs to get in and out of vehicles. One known type of wheelchair lift is manufactured by the Wako Industry Company, Ltd., a Japanese company which provides a foldable platform wheelchair lift having a hydraulic power control to move the lift among three interval positions, i.e., a vertical stowed position inside a vehicle, an entry position substantially horizontal and coplanar to the vehicle floor, and a ground position to load or unload a wheelchair on or off the platform. The lift operations are automatic power controlled. The folding/unfolding operations of the platform are manual controlled. The lift platform has two pivotable sections in which an outer section can pivot relative to an inner section so that the loading surface of those two sections can be first folded to face each other (the outer section pivots relative to the inner section 180°, flip over and rest on the top of the inner section) and then the inner section pivots again toward the interior of the vehicle along with the outer section to a vertical stowed position.

U.S. Pat. No. 4,353,436 issued to Rice et al. on Oct. 12, 1982 discloses a manual wheelchair lift for moving a wheelchair and its occupant to and from the floor of the vehicle. The lift includes a mounting apparatus and a support assembly movably mounted to the mounting apparatus for being pivotally or translationally movable between a storage position and an outwardly extending operating position. The lift can be operated by an electric power control to move up and down. A platform structure includes an outer platform member and an inner platform member. The platform can be manually folded between a storage position and a loading position. The platform is folded in the following manner. The outer platform member pivots 180° to a storage position overlying the inner platform member and the folded configuration of the inner and outer platform members additionally folded about the pivot axles to a vertical orientation (pivoting 90°) to the final storage position.

U.S. Pat. No. 4,534,450 issued to Savaria on Aug. 13, 1985 discloses a vehicular wheelchair lift assembly installed in a vehicle providing a clear door access even when it is in a stored position. The lift assembly comprises a platform which is made of a frame supporting two independent sections displaceable between a coplanar position and a transverse position. The platform is rotatable between an upstanding stored position inside the vehicle and an outside intermediate position level parallel with the vehicle floor and moveable from that position to the ground and inversely.

It is desirable to further design and develop a powered wheelchair lift with an automatic foldable platform assembly which folds into two platform plates such that the two plates are collapsed transversely cross the platform assembly during the swing-up stowaway motion and unfolds the platform assembly during the swing-down deployment motion to unfold the two plates into a substantially horizontal position and coplanar to each other between entry and ground positions. The folded platform assembly is hidden inside the vehicle because of its low vertical stowing profile which creates more visibility of the vehicle opening or windows and requires less stowing/stowage height and space than existing wheelchair lifts. It is also desirable to provide a powered wheelchair lift with a foldable platform assembly with a substantially extended usage length and limited vehicle stowage space which are required sometimes in large trains or commercial transit vehicles, etc.

SUMMARY OF THE INVENTION

The present invention is a powered vehicular wheelchair lift with an automatic folding platform assembly for persons who are physically challenged or otherwise have limited mobility.

It is an object of the present invention to provide a vehicular wheelchair lift with a foldable platform assembly, where the wheelchair lift is mounted within a vehicle such that the platform assembly is foldable to form a vertical low profile arrangement in a stowed position within the vehicle.

It is also an object of the present invention to provide a vehicular wheelchair lift which is fully automatic in both raising/lowering and unfolding/folding of the platform assembly.

It is an additional object of the present invention to provide a vehicular wheelchair lift with a foldable platform assembly which folds into two plates such that the two plates are collapsed transversely cross the platform assembly during the swing-up stowaway motion, and also unfolds the platform assembly during the swing-down deployment motion to open the two plates into a substantially horizontal position and coplanar to each other.

It is a further object of the present invention to provide a vehicular wheelchair lift with a foldable platform assembly with a substantially extended usage length which is required sometimes in large trains or commercial transit vehicles, etc.

It is still a further object of the present invention to provide a vehicular wheelchair lift with a foldable platform assembly which folds into two plates such that the two plates are collapsed transversely cross the platform assembly during the swing-up stowaway motion, and also unfolds the platform assembly during the swing-down deployment motion to unfold the two plates into a substantially horizontal position and coplanar to each other. Each plate further includes a smaller innermost plate which folds transversely cross the platform assembly for allowing a person to step cross the wheelchair lift even when it is in the stowed position to facilitate entering or exiting of the vehicle and further facilitates a person to load and unload objects from the vehicle.

Described generally, the present invention is a wheelchair lift for use in conjunction with a vehicle having a vehicle opening and a floor. The wheelchair lift includes a mounting assembly mounted to the vehicle floor adjacent to the vehicle opening. It may be actuated by a hydraulic actuating system which includes a pair of hydraulic cylinders mounted on opposite sides of a pair of relative parallelogram linkage structures of the wheelchair lift. The wheelchair lift also has a foldable platform assembly which includes two plates hingeably connected along their adjacent transverse edges, where the platform assembly moves from a stowed position inside the vehicle to an entry position at the vehicle opening and inversely (i.e., from the entry level position to the stowed position), and moves the platform assembly between the entry level position and a ground level position outside the vehicle and inversely (i.e., from the ground level position to the entry level position). The wheelchair lift further has means for facilitating the unfolding of the platform assembly as the platform assembly moves from the swing-down deployment motion (from the stowed position to the entry level position) to unfold the two plates into a substantially horizontal position and coplanar to each other, and also the folding of the platform assembly as the platform assembly moves during the swing-up stowaway motion (entry level position to the stowed position). With this arrangement, the platform assembly can be automatically unfolded and deployed at the entry level position, and further moved to the ground level position in the unfolded condition and inversely, and automatically folded and stowed at the stowed position to form a vertical low profile, which creates more visibility of the vehicle opening.

In order to clear the door clearance in a vehicle, the prior art wheelchair lift was determined by the door size and shape. Therefore, the lift was sometimes installed tilted inward or positioned far inside from the door to avoid the interference with the door, or a small platform was chosen so as to meet the door clearance requirement. By having the present invention foldable platform, a wide range of platform sizes as per a customer's preference can be installed with a limited stowage room in the vehicle, and the lift can be installed flat to the floor, not tilted (safety) and allowed the lift to be installed closer to the door.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
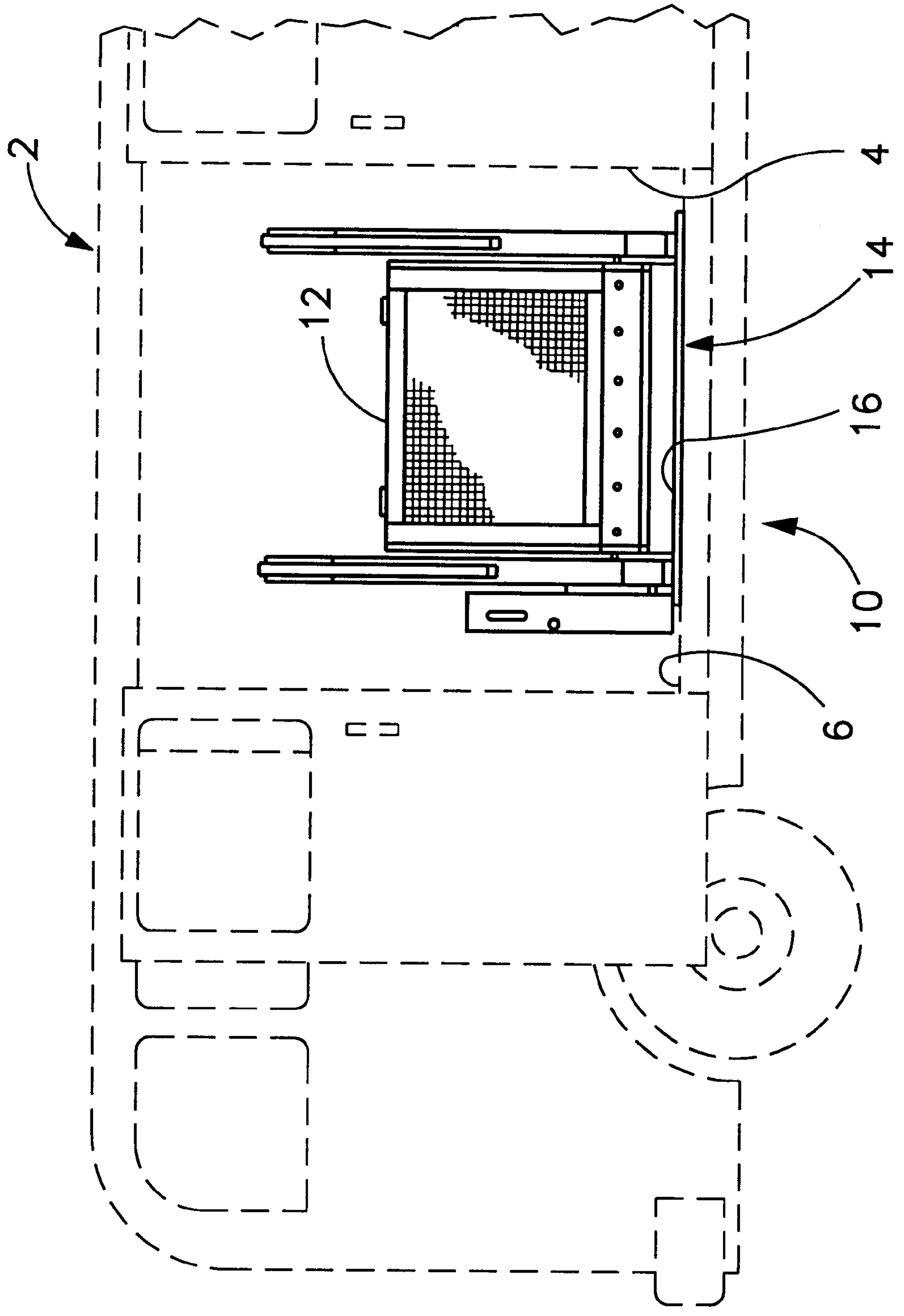
FIG. 1 is an illustrative view of the present invention powered wheelchair lift mounted in a vehicle, showing a foldable platform assembly in its stowed position.

Referring to FIG. 1, there is depicted at 10 the present invention powered wheelchair lift in its stowed position where a foldable platform assembly 12 is fully folded and stowed. The wheelchair lift 10 is installed inside a vehicle 2 (shown in dashed lines) adjacent an opening 4 such as a side door of the vehicle 2. However, it is also within the spirit and scope of the present invention to install the wheelchair lift 10 adjacent to a rear door opening (not shown) of the vehicle 2. The lift 10 is firmly secured on the doorway of the vehicle 2 by a mounting assembly 14 which mainly includes an anchoring plate 16 that is secured on the vehicle floor 6 by conventional means.

Figure 2:
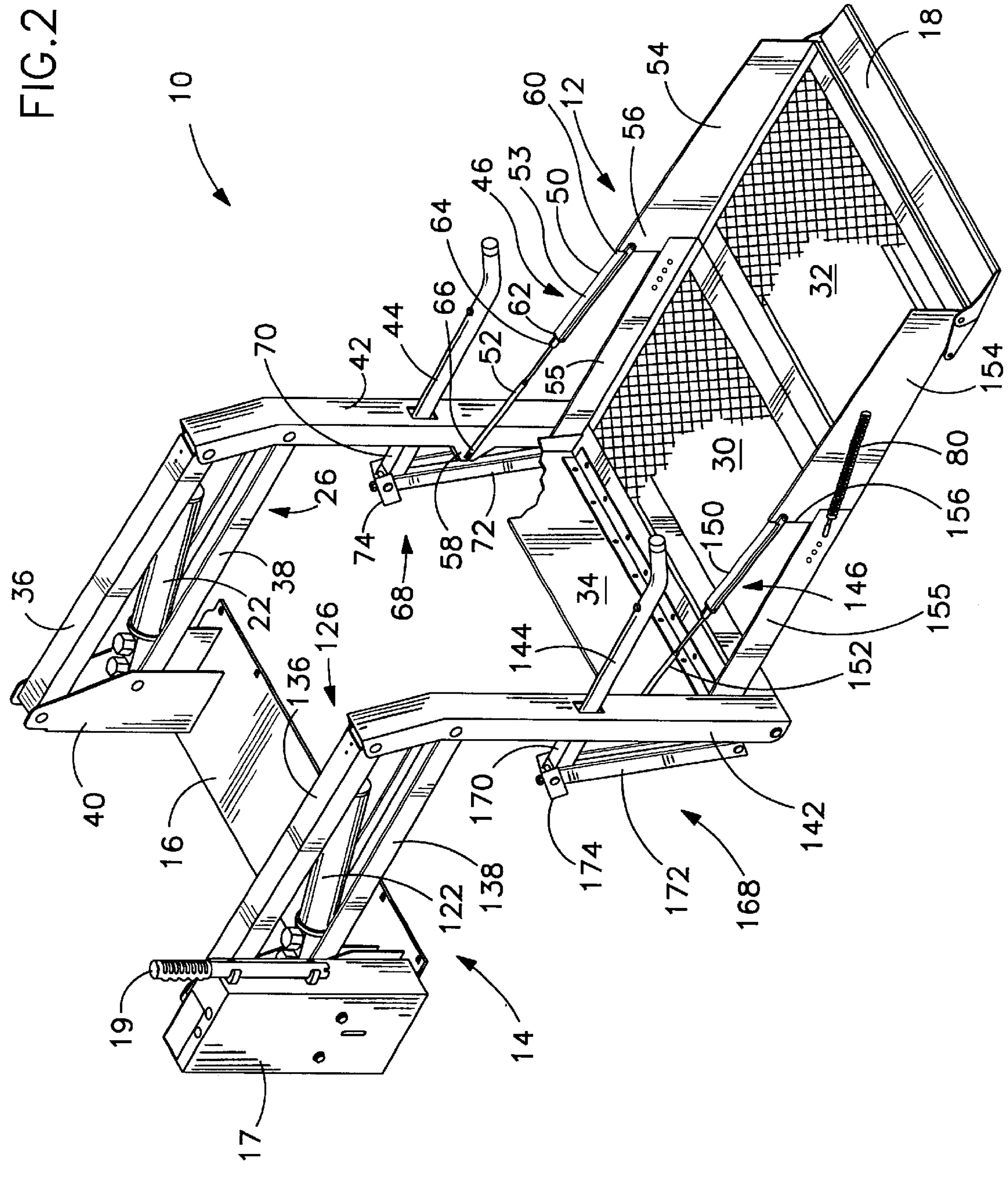
FIG. 2 is a perspective view of the present invention powered wheelchair lift, showing the foldable platform assembly when it is in a ground level position.

Referring to FIG. 2, there is depicted a perspective view of the present invention wheelchair lift 10, where the foldable platform assembly 12 is in a ground level position with an outer roll stop means 18 fully opened and allows a person in a wheelchair (not shown) to roll off the platform assembly 12 to the ground level (outside of the vehicle) and inversely. The outer roll stop means 18 is a self-engaged mechanism for preventing the wheelchair from rolling-off the front of the platform assembly before the platform assembly reaches the ground level position as shown.

Figure 3:
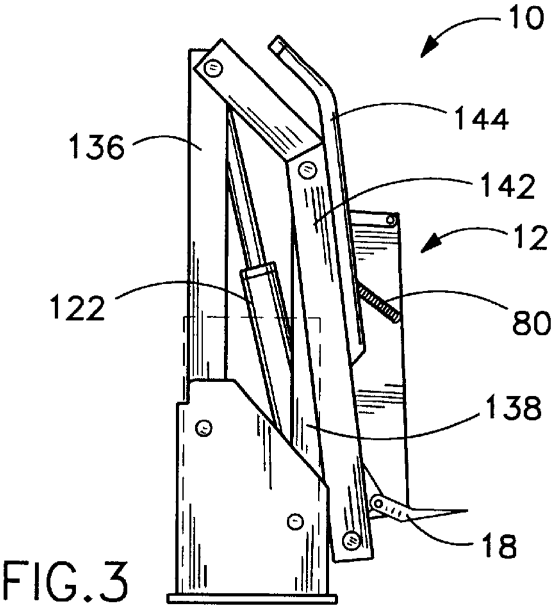
FIG. 3 is a side elevational view of the present invention powered wheelchair lift, showing the foldable platform assembly when it is in the stowed position.
Figure 4:
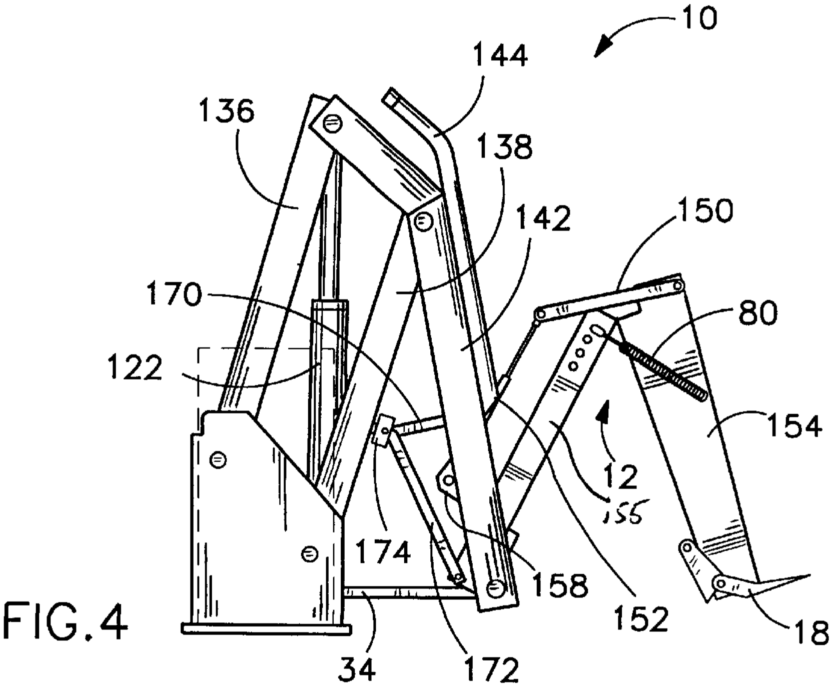
FIG. 4 is a side elevational view of the present invention powered wheelchair lift, showing the foldable platform assembly between the stowed position and an entry level position.

The platform assembly 12 can be lifted upwardly and downwardly among a stowed position (see FIG. 3), an entry level position (see FIG. 5) and the ground level position by a power actuating system. The actuating system may be controlled electrically, hydraulically or in any other conventional way known to one skilled in the art. For demonstration purposes only, a hydraulic actuating system is described herewith. The hydraulic actuating system includes a hydraulic pump (not shown), a hydraulic power unit 17, a manual backup pump handle 19, and a pair of opposite hydraulic cylinders 22 and 122. The hydraulic cylinders 22 and 122 are mounted in two relative parallelogram actuating linkage structures 26 and 126 which are fixed to the anchoring plate 16 by conventional means. All which are well known in the art, and the description thereof will not be described in detail, but will be described in general terms later.

The platform assembly 12 includes an inner platform plate 30 and an outer platform plate 32. The inner and outer plates 30 and 32 are pivotably connected along their transverse adjacent edges. In the stowed position, the two plates 30 and 32 are collapsed transversely across the platform assembly 12 and folded against each other such that their undersides abut against each other, and oriented in a substantially vertical low profile arrangement relative to the vehicle doorway (see FIG. 3).

Figure 5:
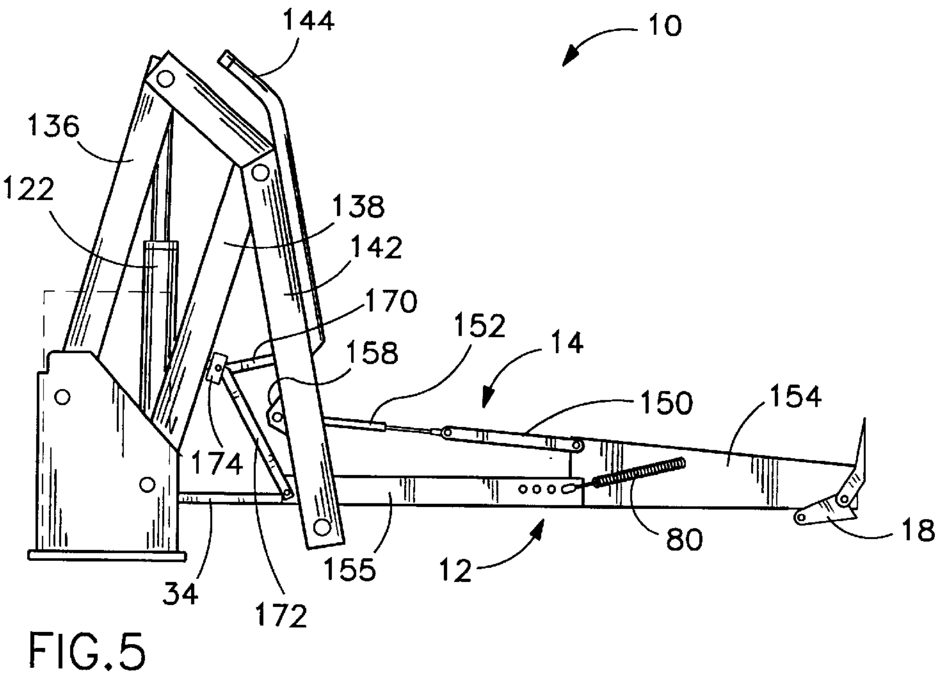
FIG. 5 is a side elevational view of the present invention powered wheelchair lift, showing the foldable platform assembly when it is in the entry level position.

Referring to FIG. 5, there is shown the present invention wheelchair lift 10 deployed at the entry level position (which is flush with the vehicle floor), thereby allowing the person in the wheelchair to roll on or off between the vehicle floor and the platform assembly 12 of the lift 10. At this position the platform assembly 12 is unfolded such that the two plates

30 and 32 are substantially horizontal and in fully coplanar alignment to each other. A bridge plate 34 is pivotally mounted to a rear edge of the inner plate 30 of the platform assembly 12 for bridging the gap space between the vehicle floor and the platform assembly 12 at the entry level.

Referring to FIGS. 2, 3, 4, and 5, there are shown the pair of actuating linkage structures 26 and 126. For ease of understanding, only the actuating linkage structure 26 will be described in detail, since it should be understood that the actuating linkage structure 126 is identical and identical parts are numbered correspondingly with 100 added to each number. The actuating linkage structure 26 includes a top actuating arm 36 and a bottom actuating arm 38 which are located substantially parallel to each other. The rear ends of the top and bottom actuating arms 36 and 38 are pivotally connected to a mounting bracket member 40 which is secured to the anchoring plate 16 by conventional means. Each front end of the top and bottom actuating arms 36 and 38 are pivotally connected to an upper portion of an elongated vertical arm 42. A pair of opposite handrails 44 and 144 are provided with the present invention wheelchair lift 10 and move with respect to the extension and retraction of the hydraulic cylinders 22 and 122.

When the hydraulic cylinders 22 and 122 are extended, they cause the vertical arms 42 and 142 to move upwardly. It is this upward motion of the vertical arms 42 and 142 that moves the platform assembly 12 upwardly. When the hydraulic cylinders 22 and 122 are retracted, they cause the vertical arms 42 and 142 to move downwardly. It is this downward motion of the vertical arms 42 and 142 that moves the platform assembly 12 downwardly.

Figure 6:
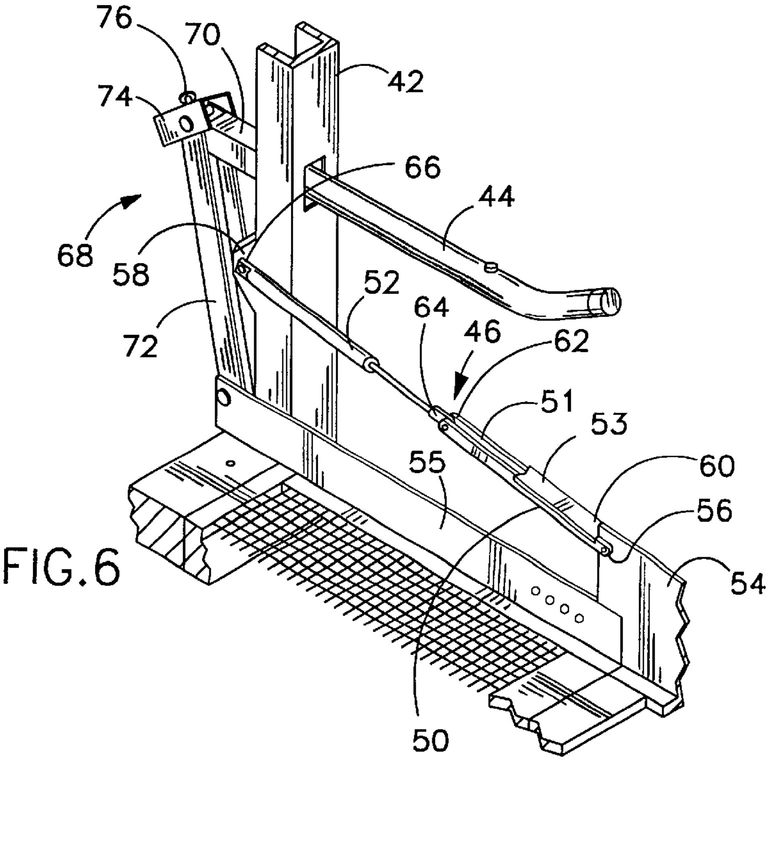
FIG. 6 is an enlarged perspective view of one of the two pivotable linkage assemblies.

Referring to FIGS. 2 and 6, there is shown means for facilitating the unfolding and folding the platform assembly 12. The means include a pair of opposite pivotable linkage assemblies 46 and 146, and a pair of opposite saddle assemblies 68 and 168. The pivotable linkage assemblies 46 and 146 are utilized for the movements of the platform assembly 12 between its stowed position (a substantially vertical and folded position) and its entry position (a substantially horizontal and unfolded position). For ease of understanding, only the pivotable linkage assembly 46 and the saddle assembly 68 will be described since it should be understood that the pivotable linkage assembly 146 and the saddle assembly 168 are respectively identical and identical parts are numbered correspondingly with 100 added to each number. The pivotable linkage assembly 46 includes a pair of linking arms 50 and 52. The first linking arm 50 has a slit 51 opening downwardly (see FIG. 6) therebetween, where a distal end 60 is pivotally connected to an end 56 of a taller side panel 54 on one side of the outer plate 32 of the platform assembly 12 to prevent the wheelchair from rolling off the sides of the outer plate 32. The proximal end 62 of the first linking arm 50 is pivotally connected to a proximal end 64 of the second linking arm 52, while the distal end 66 of the second linking arm 52 is pivotally connected to an extended portion 58 of the vertical arm 42. A shorter side panel 55 is formed with one side of the inner plate 30 for preventing the wheelchair from rolling off the sides of the inner plate 30. It should be pointed out that the height of the side panels 54 and 55 may be made relatively the same.

The taller side panel 54 extends over a portion of the shorter side panel 55. What is unique about this is that the shorter side panel 55 will be foldable such that a front edge of the shorter side panel 55 slides into the slit 51 provided on the first linking arm 50 (see FIG. 4) for facilitating the unfolding and folding of the platform assembly 12. There is provided an elongated top cover 53 which covers the slit 51, so that the shorter side panel 55 slides into the slit 51 against the top cover 53 in order to guide and align the panel 55 and also to allow the folding or unfolding process more steady and gentle.

The saddle assembly 68 includes a substantially horizontal knuckle link 70, a substantially vertical knuckle link 72, and a saddle block 74. One end of the horizontal knuckle link 70 may be connected to the handrail 44 while the other end is pivotally connected to the saddle block 74. One end of the vertical knuckle link 72 is pivotally connected to the horizontal knuckle link 70 and the saddle block 74 while the other end is pivotally connected to the rear end of the inner platform plate 30 of the platform assembly 12. The saddle block 74 may have a smooth contacting surface or have a knuckle piece 76 as shown in FIG. 6 for engaging with an opening underneath the bottom actuating arm 38 when the lift moves between the entry level position and the stowed position. By this arrangement, the motions of the platform assembly 12 are well controlled and especially prevent the platform assembly 12 from free falling or free deploying movement during the lift's swing-up and swing-down motions. When the platform assembly 12 is away from its entry position to the ground level position (see FIG. 2), the knuckle pieces 76 and 176 are disengaged with the underneath sides of the bottom actuating arms 38 and 138. As the platform assembly 12 is lifted up from its entry level position towards its stowed position, the saddle blocks 74 and 174 or the knuckle pieces 76 and 176 come into contact with the bottom actuating arms 38 and 138 which push down the vertical knuckle links 72 and 172, and the inner platform plate 30 is raised through the pivot connection. The pivotable linkage assemblies 46 and 146 allow the outer platform plate 32 to be folded down. This provides an automatic stowing of the platform assembly 12.

It will be appreciated that the present invention is not limited to the saddle assemblies 68 and 168. It is emphasized that while the saddle assemblies are the preferred embodiments, it is also within the spirit and scope of the present invention to utilize roller assemblies (not shown).

Spring means 80 (only one side is shown) may be provided with the present invention wheelchair lift 10. The spring means 80 are respectively connected to the taller side panels 54 and 154 of the outer platform plate 32 and the shorter side panels 55 and 155 of the inner platform plate 30 for assisting in unfolding and folding of the two plates 30 and 32 of the platform assembly 12.

The present invention wheelchair lift 10 has a unique motion pattern. From the stowed position to the entry level position, the lift 10 deploys from a substantially vertical position to a substantially horizontal position along with the unfolding movement of the platform assembly 12 from a fully folded condition to a fully unfolded condition. From the entry level position to the ground level position, the lift 10 moves downwardly along an arc path while the platform assembly 12 keeps its unfolded and substantially horizontal condition. When the lift 10 moves back from the ground level position to the stowed position, it goes through the reverse motions.

Figure 8:
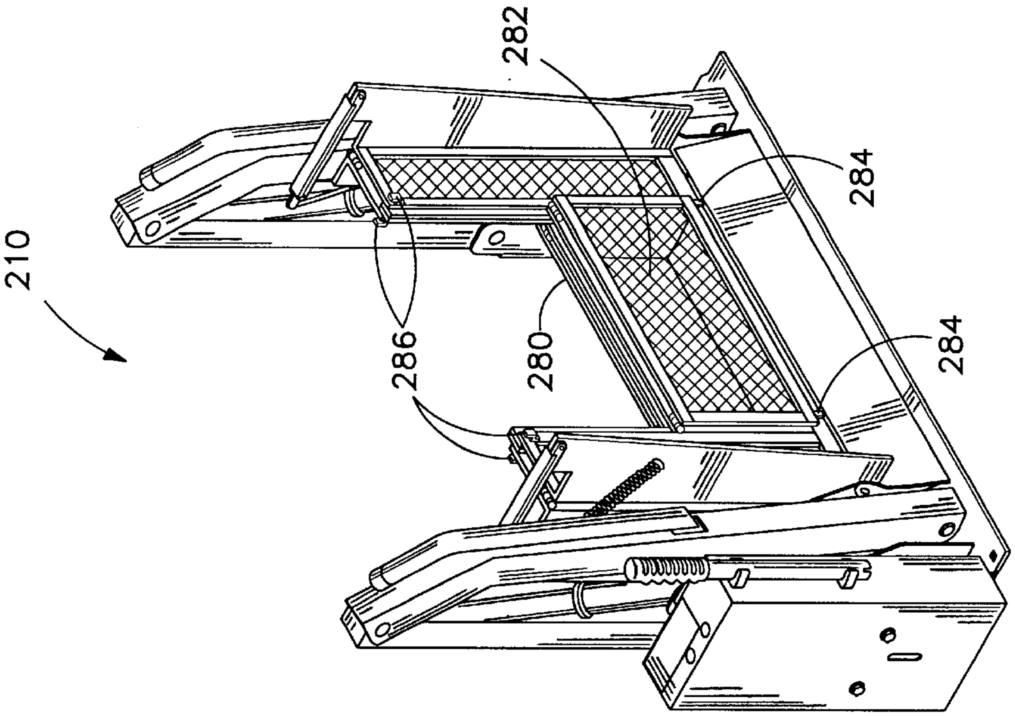
FIG. 8 is a perspective view of the present invention powered wheelchair lift shown in FIG. 7, showing the foldable platform assembly in the stowed position and two smaller innermost plates folded.
Figure 7:
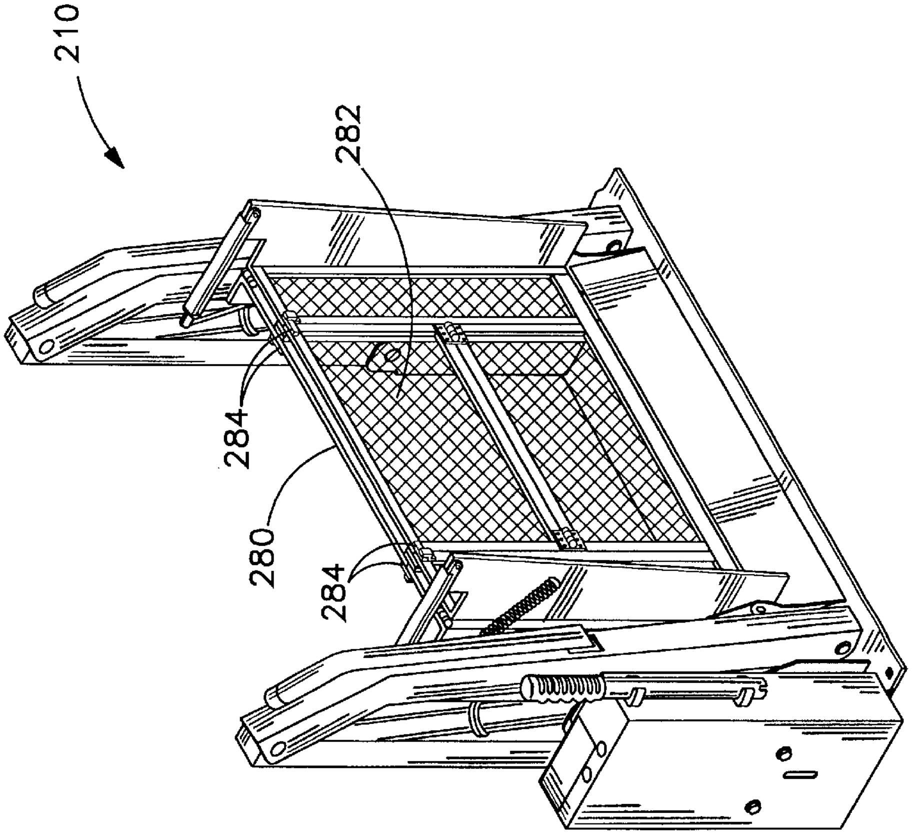
FIG. 7 is a perspective view of an alternative embodiment of the present invention powered wheelchair lift, showing the foldable platform assembly in the stowed position and two smaller innermost plates unfolded.
Figure 9:
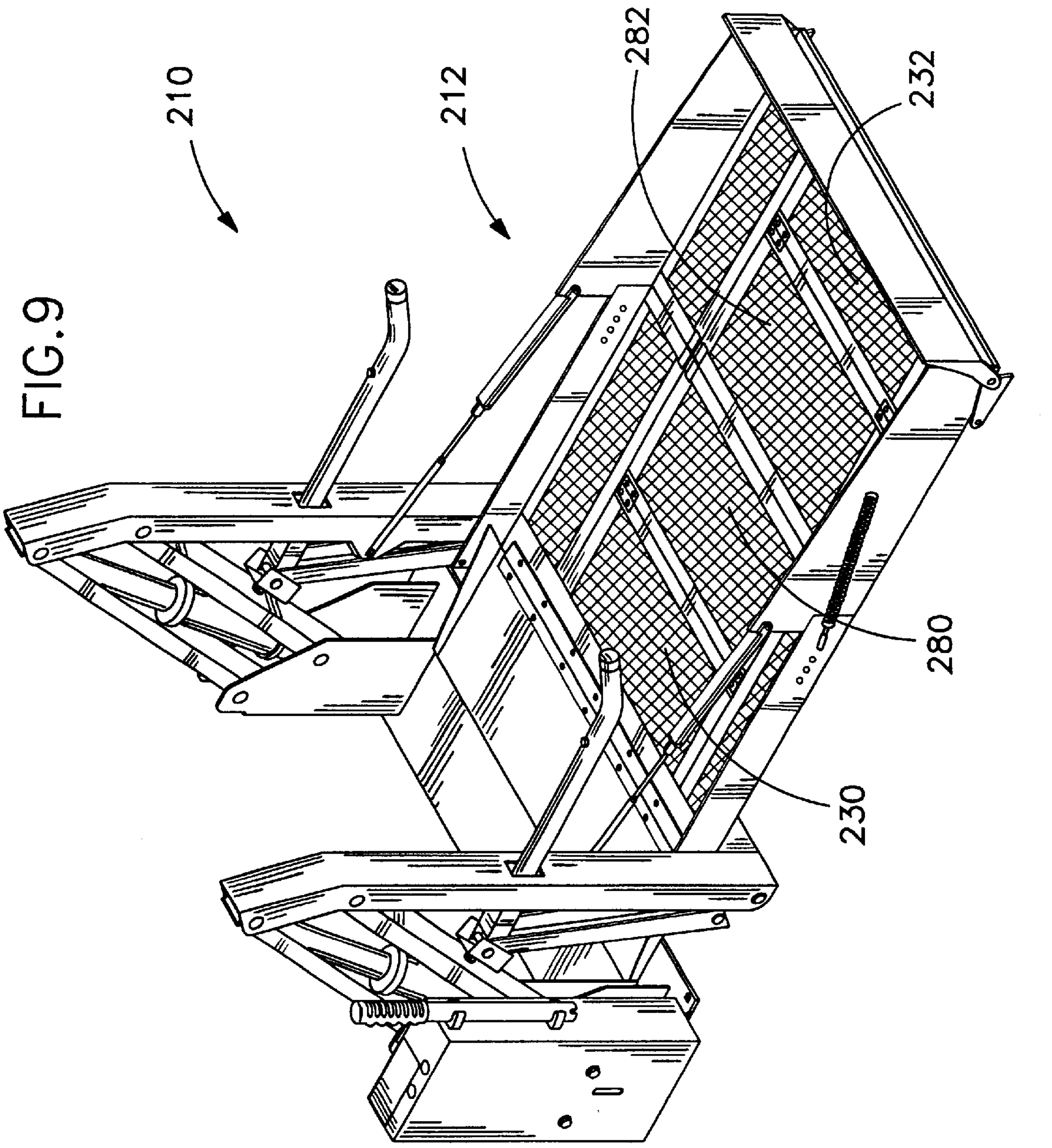
FIG. 9 is a perspective view of the present invention powered wheelchair lift shown in FIG. 7, showing the foldable platform assembly in an entry level position.

Referring to FIGS. 7, 8 and 9, there is shown an alternative embodiment of the present invention powered wheelchair lift 210. FIG. 7 shows the powered wheelchair lift 210 with the platform assembly 212 folded. FIG. 8 shows the powered wheelchair lift 210 with the platform assembly 212 folded with two additional foldable innermost plates 280 and 282 in a folded condition. FIG. 9 shows the powered wheelchair lift 210 with the platform assembly 212 in an entry level position. In this embodiment, the powered wheelchair lift 210 is very similar to the preferred embodiment just described above and the description thereof will not be repeated, and the only difference is the nature and configuration of the platform assembly 212. All components of the alternative embodiment of the powered wheelchair lift 210 are numbered with 200 added to the correspondence component number shown in the previous embodiment.

The platform assembly 212 includes an inner platform plate 230, an outer platform plate 232 and a pair of innermost plates 280 and 282 which are hingeably connected along at their transverse adjacent edges to the inner and outer plates 230 and 232, respectively. These innermost plates 280 and 282 may be manually folded and unfolded in a stowed position. To fold these innermost plates 280 and 282, a person can turn latching pins 284 which are pivotably mounted on the innermost plate 280 and 282 to unlatch them from securing means such as brackets 286 which are fixed on the inner and outer platform plates 230 and 232, where the innermost plates 280 and 282 can be folded downwardly by a manual force.

After the two innermost plates 280 and 282 are manually unfolded and the latching pins 284 are then turned to secure them to the securing means 286 (see FIG. 7) in the stowed position. The platform assembly 212 can be unfolded the same way as the preferred embodiment such that the inner plate 230 and the outer plate 232 are substantially horizontal and in fully coplanar alignment to each other.

Referring to FIG. 8, the uniqueness of the two innermost plates 280 and 282 is to provide an access opening on the wheelchair lift 210 in the stowed position so that one can easily step-cross the platform assembly 212 to enter or exit the vehicle or to easily load and unload objects through the wheelchair lift 210.

Defined in detail, the present invention is a wheelchair lift for use in conjunction with a vehicle having an opening and a floor, the wheelchair lift comprising: (a) a mounting assembly for mounting on the vehicle floor adjacent to the vehicle opening; (b) a pair of opposite actuating structures attached to the mounting assembly; (c) a pair of opposite actuating means respectively mounted within the pair of actuating structures; (d) a foldable platform assembly having an inner platform plate and an outer platform plate, the inner and outer plates pivotably connected along their transverse adjacent edges; (e) the pair of actuating structures pivotably mounted to the inner platform plate for automatically moving the platform assembly from a stowed position inside the vehicle to an entry level position at the vehicle door opening and inversely, and automatically moving the platform assembly from the entry level position to a ground level position outside the vehicle and inversely; and (f) a pair of opposite pivotable linkage assemblies connected to the outer platform plate for automatically unfolding the two platform plates in a transverse direction cross the platform assembly as the platform assembly is moving between the stowed position to the entry level position, and also automatically folding of the two platform plates in the transverse direction cross the platform assembly as the platform assembly is moving between the entry level position to the stowed position; (g) whereby the platform assembly can be automatically unfolded and deployed at the entry level position, and further moved to the ground level position in an unfolded condition, and inversely, and automatically folded and stowed at the stowed position to a low profile and in a substantially vertical orientation adjacent to the vehicle opening.

Defined broadly, the present invention is a wheelchair lift for use in conjunction with a vehicle having an opening and a floor, the wheelchair lift comprising: (a) a power actuating system; (b) a platform assembly having at least two plates pivotably connected along their transverse adjacent edges; (c) a linking assembly connected to the power actuating system and the platform assembly for automatically moving the platform assembly from a stowed position inside the vehicle to an entry level position at the vehicle opening and inversely, and moving the platform assembly from the entry level position to a ground level position outside the vehicle and inversely; and (d) means for automatically facilitating the unfold of the at least two plates of the platform assembly in a transverse direction as the platform assembly is moving between the stowed position to the entry level position, and also automatically fold of the at least two plates of the platform assembly in the transverse direction as the platform assembly is moving between the entry level position to the stowed position; (e) whereby the platform assembly can be automatically unfolded and deployed at the entry level position in a substantially horizontal orientation, and further moved to the ground level position in the unfolded condition and inversely, and automatically folded and stowed at the stowed position to form a vertically low profile arrangement in a substantially vertical orientation adjacent to the vehicle opening.

Defined more broadly, the present invention is a wheelchair lift for use in conjunction with a vehicle having an opening, the wheelchair lift comprising a power actuating system and a foldable platform assembly having at least two plates pivotably connected at their transverse adjacent edges which automatically unfold during a swing-down deployment motion of the platform assembly, and also automatically fold during a swing-up stowaway motion of the platform assembly actuated by the power actuating system to form a vertical low profile arrangement adjacent to the opening.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A wheelchair lift for use in conjunction with a vehicle having a floor, the lift comprising:

a power actuating system;

a platform assembly having an inner plate proximal the vehicle and an outer plate distal the vehicle when the platform is in a fully extended configuration, the outer plate having a side wall extending therefrom, the side wall having a first end proximal the inner plate and a second end distal the inner plate;

a linking assembly connecting the power actuating system to the platform assembly, the linking assembly having, a vertical arm connected to the platform assembly;

fold-facilitating link connecting the vertical arm to the first end of the side wall of the outer plate;

wherein during a folding process, the fold-facilitating link causes the outer plate to pivot with respect to the inner plate.

2. The wheelchair lift of claim 1, wherein the inner plate and the outer plate each have a top surface and a bottom surface, wherein in the fully extended configuration, the bottom surfaces of the inner and outer plates face the same direction and wherein in a folded configuration, the bottom surface of the outer plate faces the bottom surface of the inner plate.

3. The wheelchair lift of claim 1 wherein the inner plate and the outer plate are pivotably connected at and foldable along their adjacent edges parallel to an extended edge of the vehicle floor.

4. The wheelchair lift of claim 1 wherein the fold-facilitating link defines a slot therein.

5. The wheelchair lift of claim 1 wherein the linking assembly comprises a parallelogram actuating structure connected to the power actuating system to rotate about a fixed axis and actuate the vertical arm.

6. The wheelchair lift of claim 5 further comprising a saddle assembly connected to the vertical arm and configured to engage a guide channel on the parallelogram actuating structure, wherein during the folding process, the saddle assembly engages the guide channel.

7. A wheelchair lift for use in conjunction with a vehicle having a floor, the lift comprising.

a power actuating system;

a platform assembly having an inner plate proximal the vehicle and an outer plate distal the vehicle when the platform is in a fully extended configuration, the outer plate having a side wall extending therefrom, the side wall having a first end proximal the inner plate and a second end distal the inner plate;

a linking assembly connecting the power actuating system to the platform assembly, the linking assembly having a vertical arm connected to the platform assembly and a parallelogram actuating structure connected to the power actuating system to rotate about a fixed axis and actuate the vertical arm;

a fold-facilitating link connecting the vertical arm to the first end of the side wall of the outer plate;

a saddle assembly connected to the vertical arm and configured to engage a guide channel on the parallelogram actuating structure;

wherein during a folding process, the saddle assembly engages the guide channel and the fold-facilitating link causes the outer plate to pivot with respect to the inner plate.

8. A wheelchair lift for use in conjunction with a vehicle having a floor, the lift comprising:

a power actuating system;

a platform assembly having an inner plate proximal the vehicle and an outer plate distal the vehicle when the platform is in a fully extended configuration, the outer plate having a side wall extending therefrom, the side wall having a first end proximal the inner plate and a second end distal the inner plate, each of the inner plate and outer plate having a top surface and a bottom surface, and wherein the inner and outer plates are pivotably connected at and foldable along their adjacent edges parallel to an extended edge of the vehicle floor;

a linking assembly connecting the power actuating system to the platform assembly, the linking assembly having a vertical arm connected to the platform assembly;

a fold-facilitating link connecting the vertical arm to the first end of the side wall of the outer plate, the fold-facilitating link defining a slot therein;

wherein in a fully extended configuration, the bottom surfaces of the inner and outer plates face a ground, wherein during a folding process, the fold-facilitating link causes the outer plate to pivot with respect to the inner plate, and wherein in a folded configuration, the bottom surface of the inner plate faces the bottom surface of the outer plate.

9. A wheelchair lift for use in conjunction with a vehicle having a floor, the lift comprising:

a power actuating system;

a platform assembly having an inner plate proximal the vehicle and an outer plate distal the vehicle when the platform is in a fully extended configuration, the outer plate having a side wall extending therefrom, the side wall having a first end proximal the inner plate and a second end distal the inner plate, the platform assembly-having a substantially vertical stowed configuration inside the vehicle, a substantially horizontal entry level configuration and a substantially horizontal ground level configuration, wherein the platform assembly can automatically move from the vertical stowed configuration to the entry level configuration, and further move from the entry level configuration to the ground level configuration;

a linking assembly connecting the power actuating system to the platform assembly, the linking assembly having a vertical arm connected to the platform assembly;

a fold-facilitating link connecting the vertical arm to the first end of the side wall of the outer plate;

wherein during a folding process, the fold-facilitating link causes the outer plate to pivot with respect to the inner plate.

10. The wheelchair lift of claim 9, wherein the inner plate and the outer plate each have a top surface and a bottom surface, wherein in the substantially horizontal entry level configuration and the substantially horizontal ground level configuration, the bottom surfaces of the inner and outer plates face the same direction, and wherein in the vertical stowed configuration, the bottom surface of the outer plate faces the bottom surface of the inner plate.

11. The wheelchair lift of claim 9 wherein the inner plate and the outer plate are pivotably connected at and foldable along their adjacent edges parallel to an extended edge of the vehicle floor.

12. The wheelchair lift of claim 9 wherein the fold-facilitating link defines a slot therein.

13. The wheelchair lift of claim 9 wherein the linking assembly comprises a parallelogram actuating structure connected to the power actuating system to rotate about a fixed axis and actuate the vertical arm.

14. The wheelchair lift of claim 13 further comprising a saddle assembly connected to the vertical arm and configured to engage a guide channel on the parallelogram actuating structure, wherein during the folding process, the saddle assembly engages the guide channel.

* * * * *